(12) United States Patent
Shintani et al.

(10) Patent No.: US 10,830,300 B2
(45) Date of Patent: Nov. 10, 2020

(54) VEHICLE DRUM BRAKE

(71) Applicants: HOSEI BRAKE INDUSTRY CO., LTD., Toyota (JP); ADVICS CO., LTD., Kariya (JP)

(72) Inventors: Satoru Shintani, Toyota (JP); Koji Mori, Toyota (JP); Kenichi Myojo, Toyota (JP); Hiroshi Hasegawa, Toyota (JP); Yoshitaka Ishimaru, Kariya (JP); Keiichi Tsurumi, Kariya (JP)

(73) Assignees: HOSEI BRAKE INDUSTRY CO., LTD., Toyota (JP); ADVICS CO., LTD., Kariya (JP)

( * ) Notice: Subject to any disclaimer, the term of this patent is extended or adjusted under 35 U.S.C. 154(b) by 71 days.

(21) Appl. No.: 16/304,428

(22) PCT Filed: May 23, 2017

(86) PCT No.: PCT/JP2017/019289
§ 371 (c)(1),
(2) Date: Nov. 26, 2018

(87) PCT Pub. No.: WO2017/204234
PCT Pub. Date: Nov. 30, 2017

(65) Prior Publication Data
US 2019/0293136 A1      Sep. 26, 2019

(30) Foreign Application Priority Data

May 24, 2016   (JP) .................................. 2016-103781

(51) Int. Cl.
*F16D 65/09*   (2006.01)
*F16D 65/22*   (2006.01)
(Continued)

(52) U.S. Cl.
CPC ............. *F16D 65/22* (2013.01); *F16D 51/20* (2013.01); *F16D 51/22* (2013.01); *F16D 65/08* (2013.01);
(Continued)

(58) Field of Classification Search
CPC ........... F16D 65/09; F16D 65/22; F16D 51/22
(Continued)

(56) References Cited

U.S. PATENT DOCUMENTS 5,322,145 A * 6/1994 Evans ....................... B60T 1/06
                                                             188/106 A
5,529,149 A * 6/1996 Johannesen ............. F16D 51/50
                                                             188/106 F
(Continued)

FOREIGN PATENT DOCUMENTS

JP    S62-172830 U    11/1987
JP    2000-055091 A    2/2000
JP    2002-168274 A    6/2002

OTHER PUBLICATIONS

Aug. 1, 2017 International Search Report issued in International Patent Application No. PCT/JP2017/019289.

*Primary Examiner* — Christopher P Schwartz
(74) *Attorney, Agent, or Firm* — Oliff PLC (57) ABSTRACT

A vehicle drum brake including: a pair of brake shoes arranged to be expanded on a backing plate; a first parking lever disposed to rotate around a predetermined mounting shaft positioned at one end portion of one of the brake shoes; a second parking lever made up of a member different from the first parking lever, disposed to rotate around the mounting shaft, and coupled to and rotated together with the first parking lever; and a strut including a first strut member engaged with the first and second parking levers, the first and second parking levers are coupled to each other by a (Continued)

coupling pin so as to be engaged with the first strut member at the same time.

10 Claims, 6 Drawing Sheets

(51) Int. Cl.
  *F16D 51/22* (2006.01)
  *F16D 51/20* (2006.01)
  *F16D 65/08* (2006.01)
  *F16D 121/14* (2012.01)
  *F16D 125/64* (2012.01)
  *F16D 65/56* (2006.01)
  *F16D 121/04* (2012.01)

(52) U.S. Cl.
  CPC ............ *F16D 65/09* (2013.01); *F16D 65/563* (2013.01); *F16D 2121/04* (2013.01); *F16D 2121/14* (2013.01); *F16D 2125/64* (2013.01)

(58) Field of Classification Search
  USPC ............... 188/106 A, 106 F, 79.51, 325–342
  See application file for complete search history.

(56) References Cited

U.S. PATENT DOCUMENTS

| | | | | |
|---|---|---|---|---|
| 5,538,112 | A * | 7/1996 | Last | F16D 65/22 |
| | | | | 188/79.54 |
| 5,720,367 | A * | 2/1998 | Evans | F16D 51/20 |
| | | | | 188/325 |
| 6,435,317 | B2 * | 8/2002 | Tanaka | F16D 65/22 |
| | | | | 188/106 F |
| 6,502,670 | B1 | 1/2003 | Asai | |

* cited by examiner

VEHICLE DRUM BRAKE

TECHNICAL FIELD

The present invention relates to a vehicle drum brake and, more particularly, to a vehicle drum brake including a parking lever expanding brake shoes via a strut when a parking brake is activated.

BACKGROUND ART

A known vehicle drum brake includes (a) a pair of brake shoes arranged on a backing plate in an expandable manner, (b) a first parking lever disposed to rotate around a predetermined mounting shaft positioned at one end portion of one of the brake shoes in a state of overlapping with one of the paired brake shoes such that the first parking lever is disposed on the backing plate side with regard to the one of the paired brake shoes, (c) a second parking lever made up of a member different from the first parking lever, disposed to rotate around the mounting shaft in a state of overlapping with the one of the paired brake shoes and the first parking lever such that the second parking lever is disposed on the side opposite to the backing plate side with respect to the one of the paired brake shoes, and coupled to and rotated together with the first parking lever, and (d) a strut having a first strut member engaged with the first parking lever and the second parking lever. For example, this corresponds to the vehicle drum brake described in Patent Document 1.

PRIOR ART DOCUMENT

Patent Document

Patent Document 1: Japanese Laid-Open Patent Publication No. 2002-168274

SUMMARY OF THE INVENTION

Problem to be Solved by the Invention

In the vehicle drum brake including a shoe-clearance automatic adjusting device of Patent Document 1, the parking lever is bent into a U-shaped cross section and engaged with the strut on both sides of one shoe web of the paired brake shoes. This restrains an unbalanced load acting on the other brake shoe during braking with the parking lever and prevents the brake shoes from changing in posture or lifting.

However, in the technique of the Patent Document 1, since the parking lever is bent into a U-shaped cross section and positioned on both sides of the brake shoe while a bent portion is linearly formed by bending, the shape of the parking lever is made larger by an amount corresponding to the bent portion. As a result, it may become difficult to ensure a gap in the vehicle drum brake for attaching a bearing of an axle tube of a vehicle, for example. Furthermore, since the parking lever needs to be reduced in plate thickness of the parking lever due to bending process, it may become difficult to ensure the strength of the parking lever.

The present invention was conceived in view of the situations and it is therefore an object of the present invention to provide a vehicle drum brake using a parking lever with sufficient strength ensured even when the size and the thickness are reduced.

Solution to Problem

To achieve the above object, a first aspect of the present invention provides a vehicle drum brake comprising: (a) a pair of brake shoes arranged to be expanded on a backing plate; (b) a first parking lever disposed to rotate around a predetermined mounting shaft positioned at one end portion of one of the brake shoes in a state where the first parking lever overlaps with the one of the paired brake shoes on the backing plate side with respect to the one of the paired brake shoes; (c) a second parking lever made up of a member different from the first parking lever, disposed to rotate around the mounting shaft in a state where the second parking lever overlaps with the one of the paired brake shoes and the first parking lever on the side opposite to the backing plate side with respect to the one of the paired brake shoes, and coupled to and rotated together with the first parking lever, and (d) a strut including a first strut member engaged with the first parking lever and the second parking lever, wherein (e) the first parking lever and the second parking lever are coupled to each other by a coupling pin so as to be engaged with the first strut member at the same time, i.e. together.

A second aspect of the present invention provides the vehicle drum brake recited in the first aspect of the invention, wherein the backing plate includes an axle through-hole formed in a central portion for allowing insertion of the axle, wherein the second parking lever includes a coupling hole on an end portion away from the mounting shaft and is coupled to the first parking lever via the coupling pin fitted to the coupling hole, and wherein the coupling pin is disposed such that a distance between the coupling pin and a center line of the backing plate is larger than a distance between the mounting shaft and the center line of the backing plate when a parking brake is not activated, where the center line of the backing plate is a center line orthogonal to a center line of the axle through-hole and a center line of the strut.

A third aspect of the present invention provides the vehicle drum brake recited in the first aspect of the invention, wherein the backing plate includes an axle through-hole formed in a central portion for allowing insertion of the axle, wherein a lever return spring is disposed such that both ends of the lever return spring are latched a latching hole formed in the first parking lever and a notch formed on the one of the paired brake shoes to urge the first parking lever to the side away from the axle through-hole, and wherein the coupling pin is located on a side away from the axle through-hole relative to a straight line connecting the center of the mounting shaft and the center of the latching hole.

A fourth aspect of the present invention provides the vehicle drum brake recited in any one of the first to third aspects of the invention, wherein the first parking lever and the second parking lever are engaged with the first strut member such that the first parking lever and the second parking lever are parallel to a center axis of the strut and are at positions symmetrical about the center axis.

Advantageous Effects of Invention

The vehicle drum brake recited in the first aspect of the invention includes the first parking lever and the second parking lever made up of a member different from the first parking lever and coupled to and rotated together with the first parking lever. The first parking lever and the second parking lever are coupled to each other by the coupling pin so as to be engaged at the same time with the first strut member, where the first parking lever and the second parking lever are located on both sides of the shoe web of one of the pair of the brake shoes. As a result, the first parking lever and the second parking lever can be integrated without forming, for example, a bent portion, so that the shapes of the first parking lever and the second parking lever are reduced in size. Furthermore, since the first parking lever and the second parking lever are formed of respective different members, no restriction is placed on the plate thickness due to the bending process, and therefore, the strength is ensured.

According to the vehicle drum brake recited in the second aspect of the invention, the backing plate has the axle through-hole formed in the central portion for allowing insertion of the axle, while the second parking lever has the coupling hole on the end portion side away from the mounting shaft and is coupled to the first parking lever via the coupling pin fitted to the coupling hole, and the coupling pin is formed such that the distance between the coupling pin and the center line of the backing plate is larger than the distance between the mounting shaft and the center line of the backing plate when the parking brake is not activated, where the center line of the backing plate is the center line orthogonal to the center line of the axle through-hole and the center line of the strut. As a result, the shapes of the first parking lever and the second parking lever are further reduced in size, so that a sufficient gap can be ensured in the vehicle drum brake for mounting the bearing of the axle, for example.

According to the vehicle drum brake recited in the third aspect of the invention, the backing plate has the axle through-hole formed in the central portion for allowing insertion of the axle, while the lever return spring is disposed such that the both ends of the lever return spring are latched the latching hole formed in the first parking lever and the notch formed on the one of the pair of the brake shoes to urge the first parking lever to the side away from the axle through-hole, and the coupling pin is formed on the side away from the axle through-hole relative to the straight line connecting the center of the mounting shaft and the center of the latching hole. As a result, the shapes of the first parking lever and the second parking lever are further reduced in size, so that a sufficient gap can be ensured in the vehicle drum brake for mounting the bearing of the axle, for example.

According to the vehicle drum brake recited in the fourth aspect of the invention, the first parking lever and the second parking lever are engaged with the first strut member such that the first parking lever and the second parking lever are parallel to the center axis of the strut and are at positions symmetrical about the center axis. As a result, for example, when the parking brake is activated to apply braking with the parking lever, the first parking lever and the second parking lever can more easily apply a load to the first strut member at the same time on both sides of the shoe web of one of the pair of the brake shoes. Therefore, the first parking lever and the second parking lever can more preferably restrain the unbalanced load from acting on the other of the pair of the brake shoes.

MODES FOR CARRYING OUT THE INVENTION

An example of the present invention will now be described with reference to the drawings. In the following examples, the figures are simplified or deformed as needed, and portions are not necessarily precisely drawn in terms of dimension ratio, shape, etc.

Example 1

Figure 1:
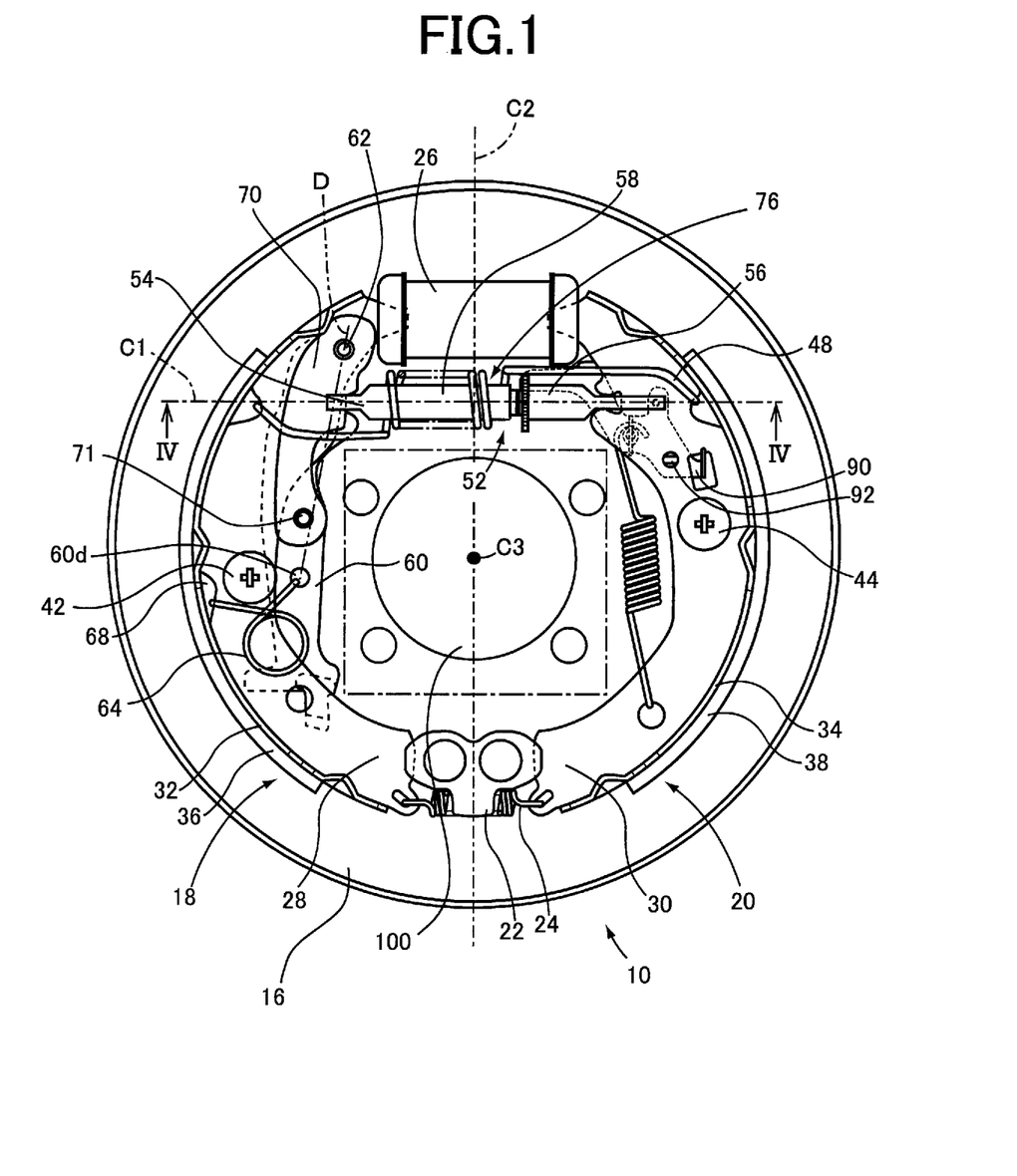
FIG. 1 is a front view showing a vehicle drum brake to which the present invention is applied.

FIG. 1 is a front view of an example of a vehicle drum brake 10 to which the present invention is applied and the vehicle drum brake 10 is a leading/trailing shoe type brake. The vehicle drum brake 10 includes a disk-shaped backing plate 16 integrally fixed to a non-rotating member such as an axle tube, an axle housing, and a suspension device of a vehicle not shown, for example. A range surrounded by a dashed-dotted line shown in FIG. 1 indicates a space in which a bearing of the axle tube of the vehicle can be mounted, for example. The backing plate 16 has an axle through-hole 100 formed in a central portion for allowing insertion of the axle. The center line of the axle through-hole 100 is indicated by a center line C3. The vehicle drum brake 10 includes a pair of brake shoes 18, 20 arranged substantially symmetrically about a center line C2 of the backing plate 16 such that the brake shoes 18, 20 can move closer to and away from each other in a posture in which the convex sides of circular arc shapes of the brake shoes 18, 20 face outward on left and right outer circumferential portions of the backing plate 16 and disposed in an expendable manner on the backing plate 16. The vehicle drum brake 10 further includes: a wheel cylinder 26 arranged between one end portions, i.e., between upper end portions in FIG. 1, of the paired brake shoes 18, 20; an anchor 22 disposed between the other end portions, i.e., between lower end portions in FIG. 1, of the paired brake shoes 18, 20 such that the anchor 22 is fixed to the backing plate 16 by rivet; and a spring 24 stretched between the other end portions of the paired brake shoes 18, 20 to bring the other end portions into constant contact with the anchor 22. The center line C2 is a line passing through the longitudinal center of the wheel cylinder 26, the longitudinal center of the anchor 22, and the center of the backing plate 16 in the front view of FIG. 1.

Each of the brake shoes 18, 20 has a shoe web 28, 30 forming a flat-plate shape substantially parallel to a plate surface of the backing plate 16 and curved into a circular arc shape as a whole in the front view shown in FIG. 1, a circular arc shoe rim 32, 34 integrally fixed along an outer circumferential end edge of the shoe web 28, 30 forming a circular arc shape so that a cross section of the brake shoe 18, 20 forms a substantially T shape, and a lining 36, 38 made of friction material integrally fixed to an outer circumferential surface of the respective shoe rim 32, 34 with an adhesive etc.

The brake shoes 18, 20 are pressed toward the backing plate 16 by shoe hold down devices 42, 44 arranged near the longitudinal centers of the shoe webs 28, 30 and are arranged in an expandable manner on the backing plate 16.

A base end portion of a first parking lever 60 having flat plate shape is coupled to the one end portion of the brake shoe 18 by a mounting shaft 62 so as to rotate around an axis of the mounting shaft 62 and in a partially overlapping manner in the front view such that the first parking lever 60 is positioned on the backing plate 16 side with respect to the brake shoe 18. Additionally, a base end portion of a second parking lever 70 having flat plate shape, which is made up of a member different from the first parking lever 60, is coupled to the one end portion of the brake shoe 18 by the mounting shaft 62 so as to rotate around the axis of the mounting shaft 62 in a partially overlapping manner in the front view such that the second parking lever 70 is positioned on the side opposite to the first parking lever 60 side, i.e., on the side opposite to the backing plate 16 side, with respect to the brake shoe 18.

Figure 2:
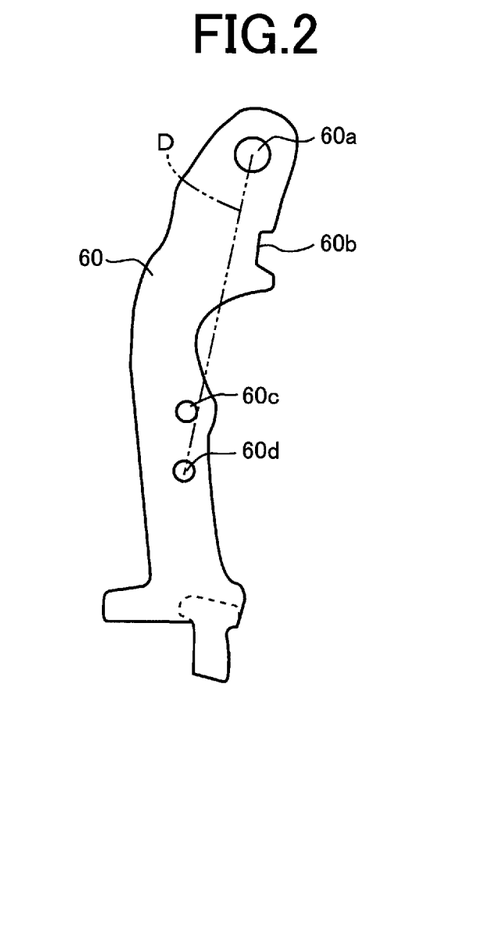
FIG. 2 is an enlarged view of a parking lever included in the vehicle drum brake of FIG. 1.

FIG. 2 is an enlarged view of the first parking lever 60, and FIG. 3 is an enlarged view of the second parking lever 70. As shown in FIG. 2, the first parking lever 60 is formed of an elongated flat plate having a gentle circular arc shape and has a mounting-shaft hole 60a formed in the base end portion for fitting the mounting shaft 62. The first parking lever 60 has a first parking lever engaging portion 60b formed linearly in the longitudinal direction on the base end portion side relative to the longitudinal center, and the first parking lever engaging portion 60b is engaged with a first engaging portion 54a formed on a first strut member 54 described later. A coupling hole (first coupling hole) 60c is formed near the longitudinal center of the first parking lever 60. The first coupling hole 60c allows a coupling member, for example, a coupling pin 71, to be press-fitted therein for coupling the first parking lever 60 to the second parking lever 70 and is fitted to the coupling pin 71. As a result, the first parking lever 60 is formed integrally with the second parking lever 70. The first parking lever 60 is provided with a latching hole 60d for latching one end portion of a lever return spring 64 stretched between the brake shoe 18 and the first parking lever 60 at a position more distant than the first coupling hole 60c from the base end portion. A leading end portion of the first parking lever 60 is an end portion on the opposite side away from the base end portion and is coupled to a parking brake cable not shown. As shown in FIGS. 1 and 2, the first coupling hole 60c is formed on the side away from the axle through-hole 100, i.e., on the brake shoe 18 side, relative to a straight line D connecting the center of the mounting-shaft hole 60a and the center of the latching hole 60d. Additionally, the first coupling hole 60c is formed such that a distance between the first coupling hole 60c and the center line C2 is larger than a distance between the mounting-shaft hole 60a and the center line C2, where the center line C2 is a center line of the backing plate 16 orthogonal to both the center line C3 of the axis through-hole 100 and a center axis C1 of a strut 52 described later. The vehicle drum brake 10 shown in FIG. 1 represents a state when no operating force is applied to the leading end portion of the first parking lever 60 via the parking brake cable by operation of a parking brake lever not shown, i.e., when a parking brake is not activated.

Figure 3:
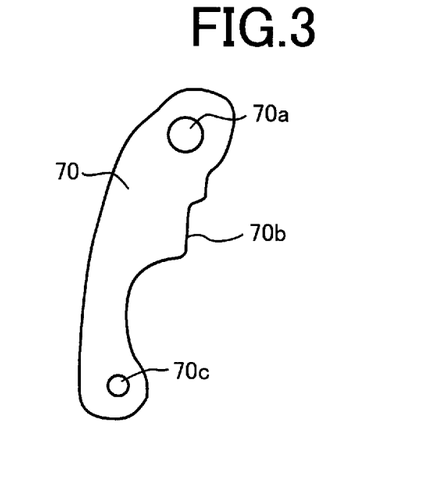
FIG. 3 is an enlarged view of another parking lever included in the vehicle drum brake of FIG. 1.

As shown in FIG. 3, the second parking lever 70 is formed of an elongated flat plate having a gentle circular arc shape and the length thereof is about half of the first parking lever 60. A mounting-shaft hole 70a for fitting the mounting shaft 62 is formed in the base end portion of the second parking lever 70. Therefore, the second parking lever 70 is coupled to the brake shoe 18 and the first parking lever 60 with the mounting shaft 62, and when the first parking lever 60 is rotated, the second parking lever 70 is integrally rotated around the mounting shaft 62. A second parking lever engaging portion 70b is formed near the longitudinal center of the second parking lever 70 linearly in the longitudinal direction, and the second parking lever engaging portion 70b is engaged with the first engaging portion 54a formed on the first strut member 54 described later. As shown in FIG. 1, the second parking lever engaging portion 70b and the first parking lever engaging portion 60b are positioned to overlap in the front view when one of the first parking lever engaging portion 60b and the second parking lever engaging portion 70b is engaged with the first engaging portion 54a, the other is also engaged with the first engaging portion 54a simultaneously. A leading end portion of the second parking lever 70 is an end portion on the opposite side away from the base end portion and is provided with a coupling hole (second coupling hole) 70c. The second coupling hole 70c allows the coupling pin 71 to be press-fitted therein for coupling the second parking lever 70 to the first parking lever 60 and is fitted to the coupling pin 71. Therefore, the second parking lever 70 is coupled to the first parking lever 60 via the coupling pin 71.

The first parking lever 60 and the second parking lever 70 are coupled to each other via the mounting shaft 62 and the coupling pin 71, and a predetermined gap can be ensured between the first parking lever 60 and the second parking lever 70 by adjusting the lengths of the mounting shaft 62 and the coupling pin 71. For example, in this example, the gap between the first parking lever 60 and the second parking lever 70 is formed by adjusting the mounting shaft 62 and the coupling pin 71 such that the brake shoe 18 is interposed between the first parking lever 60 and the second parking lever 70 and that the first parking lever 60 and the second parking lever 70 are parallel to each other.

Figure 4:
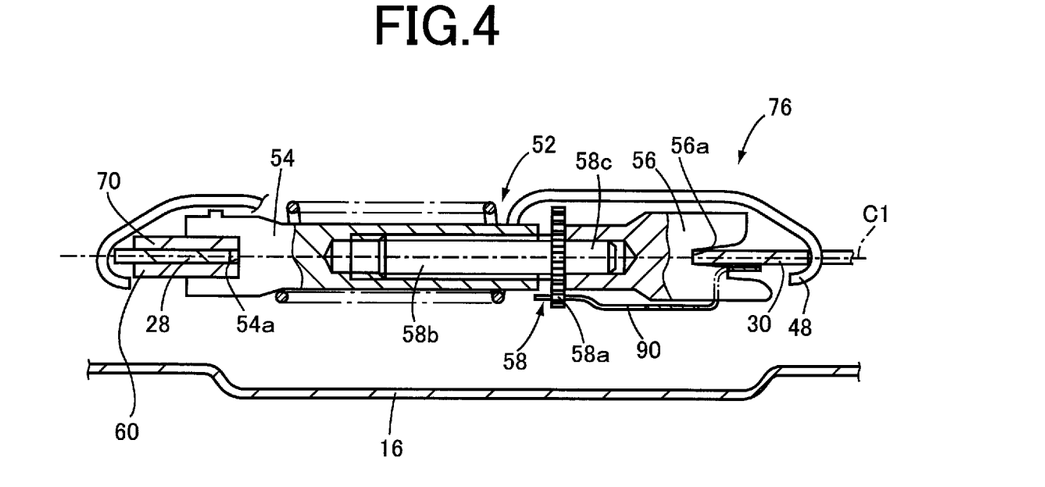
FIG. 4 is an enlarged view showing a main portion of a shoe-clearance automatic adjusting device included in the vehicle drum brake of FIG. 1 and is a cross-sectional view taken along a line IV-IV of FIG. 1.

Returning to FIG. 1, the vehicle drum brake 10 has a shoe-clearance automatic adjusting device 76 bridged between the one end portions, i.e., between the end portions on the wheel cylinder 26 side of the paired brake shoes 18, 20, for automatically adjusting a size of a shoe clearance between the brake shoes 18, 20 and a rotating drum. FIG. 4 is an enlarged view showing a main portion of the shoe-clearance automatic adjusting device 76 and is a cross-sectional view taken along a line IV-IV of FIG. 1. As shown in FIGS. 1 and 4, the shoe-clearance automatic adjusting device 76 includes the strut 52 inserted through the inside of a return spring 48 wound into a coil shape, and when the vehicle drum brake 10 is not activated, a standby position of the pair of the brake shoes 18, 20 is determined by an urging force of the return spring 48.

The strut 52 includes the first strut member 54 having an elongated shape and having the first engaging portion 54a engaged with the first parking lever 60 and the second parking lever 70, and a second strut member 56 having an elongated shape and having a second engaging portion 56a engaged with one end portion of the shoe web 30 of the brake shoe 20. The strut 52 further includes an adjusting shaft 58 disposed between the first strut member 54 and the second strut member 56 and rotated around the center axis C1 to extend a distance between the first strut member 54 and the second strut member 56. The center axis C1 is the center axis of the strut 52, and the first strut member 54 and the second strut member 56 are arranged concentrically with the center axis C1.

With the first engaging portion 54a, the first parking lever 60 and the second parking lever 70 are engaged in a direction parallel to the center axis C1 of the strut 52 and at a position symmetrical about the center axis C1. Specifically, the first engaging portion 54a is formed to be orthogonal to the center axis C1, and the first parking lever engaging portion 60b linearly formed on the base end portion side of the first parking lever 60 and the second parking lever engaging portion 70b linearly formed on the base end portion side of the second parking lever 70 are adjusted by the mounting shaft 62 and the coupling pin 71 and thereby engaged with the first engaging portion 54a at the same time, i.e. together in a direction parallel to the center axis C1 and at positions symmetrical about the center axis C1.

As shown in FIGS. 1 and 4, the adjusting shaft 58 integrally includes a substantially disk-shaped adjustment wheel 58a, a screw shaft portion 58b projected in a substantially circular columnar shape from a rotational center portion of the adjustment wheel 58a toward the first strut member 54 and provided with a male thread threaded to a female thread formed on the first strut member 54, and a fitting shaft portion 58c projected in a substantially circular columnar shape from a central portion of the adjustment wheel 58a toward the second strut member 56 and fitted to the second strut member 56 slidably in the center axis C1 direction and around the center axis C1. The adjustment wheel 58a is formed to have a larger diameter than the diameter of the screw shaft portion 58b, the diameter of the fitting shaft portion 58c, the outer diameter of the first strut member 54, and the outer diameter of the second strut member 56.

Outer circumferential teeth not shown are formed on the adjustment wheel 58a, and an adjustment lever 90 is engaged with the outer circumferential teeth. The adjustment lever 90 is disposed on the backing plate 16 side with regard to the brake shoe 20 and on the one end side of the brake shoe 20 and is coupled to the brake shoe 20 by an adjustment-lever mounting shaft 92. The adjustment lever 90 is rotated around the adjustment-lever mounting shaft 92. When the adjustment wheel 58a is rotated by the adjustment lever 90 in one direction at the time of breaking on the basis of driving of the brake shoes 18, 20 by the wheel cylinder 26, the first strut member 54 is moved in, for example, a direction away from the second strut member 56 due to a screw action between the male thread formed on the screw shaft portion 58b and the female thread formed on the first strut member 54. When the first strut member 54 is moved in the direction away from the second strut member 56, the distance between the first engaging portion 54a and the second engaging portion 56a, i.e., the longitudinal distance of the strut 52, is increased.

Figure 5:
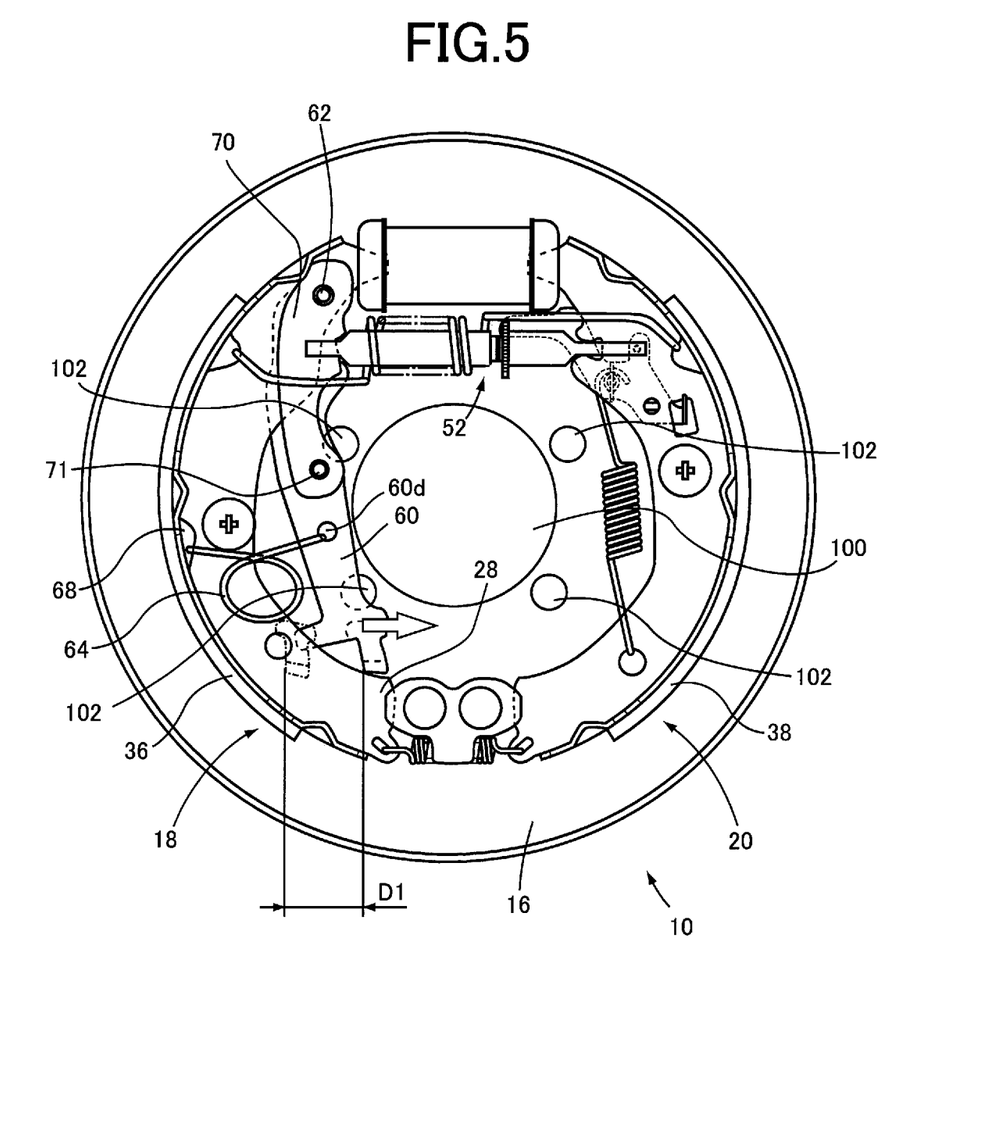
FIG. 5 is a view of movement of the parking lever when a parking brake is activated in the vehicle drum brake to which the present invention is applied.

FIG. 5 is a view of movement of the parking lever when the parking brake is activated in the vehicle drum brake 10 to which the present invention is applied. When an operating force is applied to the leading end portion of the first parking lever 60 in a direction of an arrow shown in FIG. 5 and the parking brake is activated, the leading end portion of the first parking lever 60 is rotated around the mounting shaft 62. Specifically, the operating force in the direction of the arrow is applied to the leading end portion of the first parking lever 60 via the parking brake cable by operation of the parking brake lever not shown so that the parking brake is activated. When the operating force in the direction of the arrow is applied to the leading end portion of the first parking lever 60, the leading end portion of the first parking lever 60 is rotated toward the center of the backing plate 16 around the mounting shaft 62. When the leading end portion of the first parking lever 60 is rotated, the brake shoe 20 is pushed by the strut 52 bridged between the one end portion of the brake shoe 18 and the one end portion of the brake shoe 20 so that the brake shoe 20 is moved to the outer circumferential side, and the brake shoe 18 is pushed by the mounting shaft 62 and moved to the outer circumferential side, and therefore, the pair of the brake shoes 18, 20 are expanded and the linings 36, 38 are brought into surface contact with an inner circumferential surface of the rotating drum not shown, so that a braking force is generated.

The lever return spring 64 having one end portion latched to the first parking lever 60 has the other end portion latched to a notch 68 disposed near the longitudinal center of the brake shoe 18. Therefore, the lever return spring 64 is stretched between the brake shoe 18 and the first parking lever 60. During non-activation of the parking brake when the pair of the brake shoes 18, 20 is not in contact with the inner circumferential surface of the rotating drum, the first parking lever 60 is brought into contact with the brake shoe 18 on the side away from the axle through-hole 100 by an urging force of the lever return spring 64.

In the vehicle drum brake 10, for example, an axle of the vehicle not shown is inserted through the axle through-hole 100 formed in the central portion of the backing plate 16, and a fastening bolt for fastening the bearing of the axle tube is inserted through a through-hole 102 formed in the backing plate 16. Therefore, a movable distance D1 of the first parking lever 60 is in a range without interference between the first parking lever 60 and the axle tube not shown, i.e., in a range in which the first parking lever 60 does not interfere with the axle through-hole 100 in the front view as shown in FIG. 5.

Figure 6:
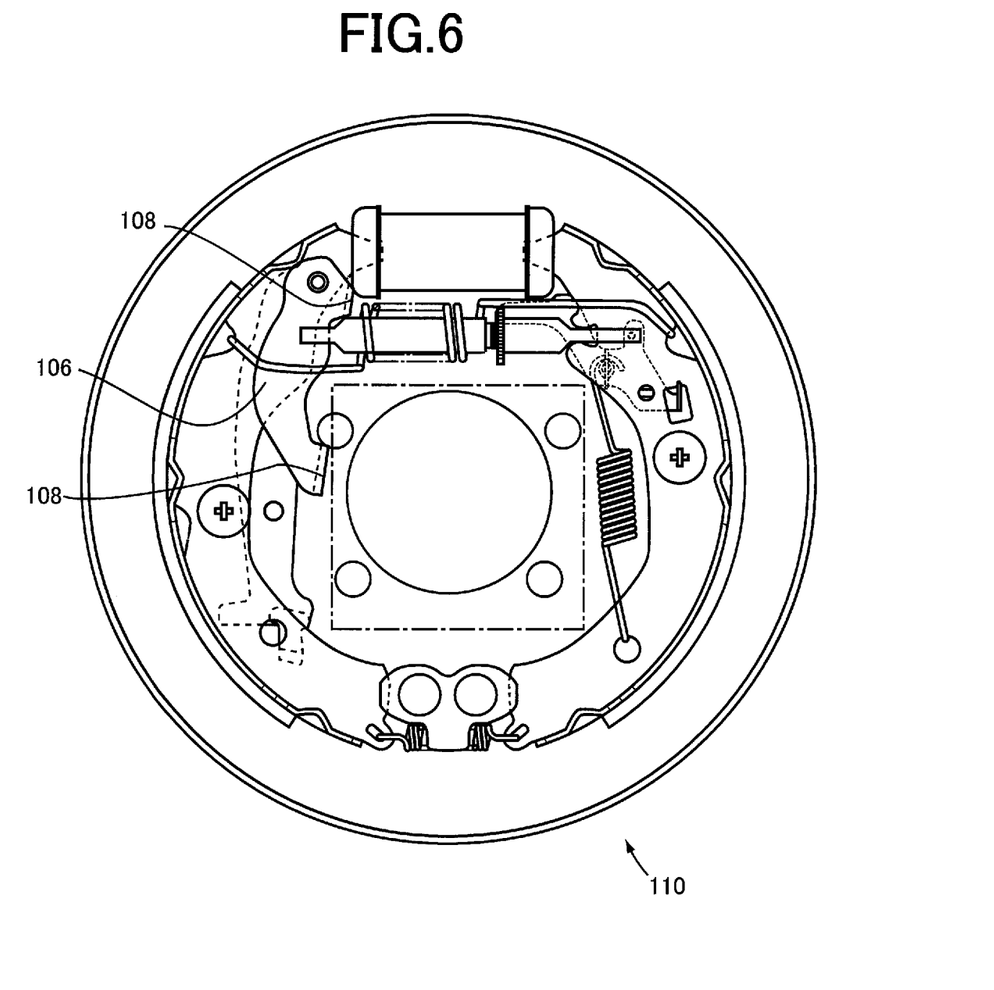
FIG. 6 is a front view of a conventional vehicle drum brake.
Figure 7:
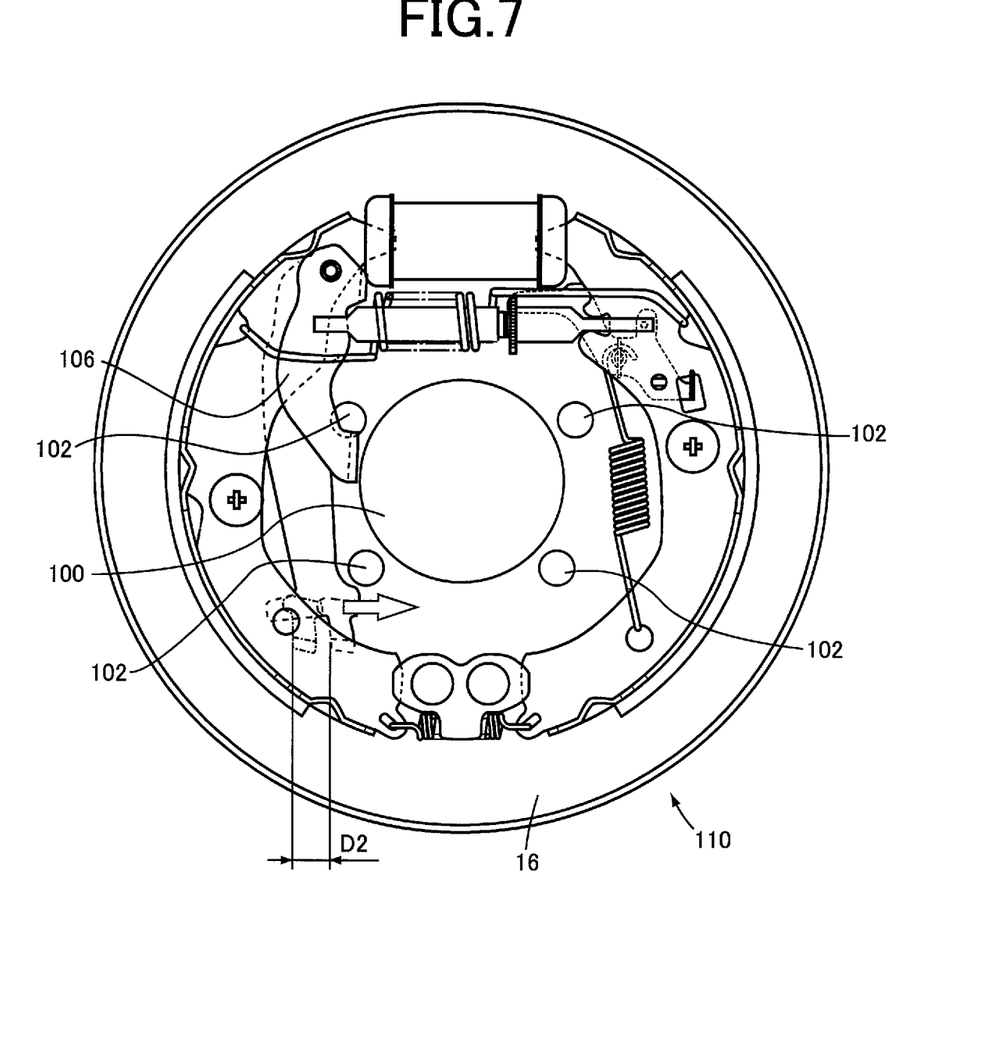
FIG. 7 is a view of movement of a parking lever when a parking brake is activated in the conventional vehicle drum brake.

FIG. 6 is a front view of a conventional vehicle drum brake 110, and FIG. 7 is a view of movement of a parking lever 106 when the parking brake is activated in the conventional vehicle drum brake 110. A range surrounded by a dashed-dotted line shown in FIG. 6 indicates an exemplar space in which a bearing of an axle tube of a vehicle can be mounted in the conventional vehicle drum brake 110. The parking lever 106 applied to the conventional vehicle drum brake 110 is subjected to a bending process of bending a single plate member into a U-shaped cross section, and a bent portion 108 is linearly formed by the bending process. Since the bent portion 108 is linearly formed in the parking lever 106, the shape of the parking lever 106 is made larger, and therefore, the conventional vehicle drum brake 110 has a smaller space in which the bearing of the axle tube can be mounted, as compared to the space in which the bearing of the axle tube can be mounted in the vehicle drum brake 10 of this example shown in FIG. 1.

In the conventional vehicle drum brake 110, an axle of the vehicle is inserted through the axle through-hole 100 formed in the central portion of the backing plate 16 as in the vehicle drum brake 10 of this example shown in FIG. 5, and therefore, a movable distance D2 of the parking lever 106 is in a range in which the parking lever 106 does not interfere with the axle through-hole 100 in the front view as shown in FIG. 7. Since the bent portion 108 is formed in the parking lever 106, the movable range of the parking lever 106 is smaller than the movable distance D1 of the first parking lever 60 of this example shown in FIG. 5.

As described above, according to this example, the vehicle drum brake 10 includes the first parking lever 60 and the second parking lever 70 made up of a member different from the first parking lever 60 and coupled to and rotated together with the first parking lever 60. The first parking lever 60 and the second parking lever 70 are coupled to each other by the coupling pin 71 so as to be engaged at the same time with the first strut member 54, where the first parking lever 60 and the second parking lever 70 are located on both sides of the shoe web 28 of the brake shoe 18 out of the pair of the brake shoes 18, 20. As a result, the first parking lever 60 and the second parking lever 70 can be integrated without forming, for example, a bent portion, so that the shapes of the first parking lever 60 and the second parking lever 70 are reduced in size. Furthermore, since the first parking lever 60 and the second parking lever 70 are formed of respective different members, restriction on the plate thickness in the bending process need not be considered, and therefore, the strength is ensured.

When the shapes of the first parking lever 60 and the second parking lever 70 are reduced in size, a sufficient gap can be ensured for mounting, for example, the bearing of the axle in the vehicle drum brake 10, and the movable distance of the first parking lever 60 can be increased. This makes it possible to deal with deterioration of braking responsiveness of the vehicle drum brake 10 due to wear of components related to braking of the parking brake, such as the linings 36, 38, the parking brake lever, and the parking brake cable, for example. Additionally, restriction on the plate thickness in the bending process need not be considered, the first parking lever 60 and the second parking lever 70 which are different in plate thickness can be selected for the vehicle drum brake 10, for example. For example, this makes it possible to use components of the vehicle drum brake 10 for different types of vehicles, so that components can easily be commonalized. Furthermore, for example, when the parking brake is activated to apply braking with the parking levers, the first parking lever 60 and the second parking lever 70 can equally apply a load to the first strut member 54 at the same time, where the first parking lever 60 and the second parking lever 70 are located on both sides of the shoe web 28 of the brake shoe 18. Therefore, an unbalanced load can be restrained from acting on the brake shoe 20.

According to this example, the backing plate 16 has the axle through-hole 100 formed in the central portion for allowing insertion of the axle, while the second parking lever 70 has the second coupling hole 70c on the end portion side away from the mounting shaft 62 and is coupled to the first parking lever 60 via the coupling pin 71 fitted to the second coupling hole 70c, and the coupling pin 71 is formed such that a distance between the coupling pin 71 and the center line C2 is larger than a distance between the mounting shaft 62 and the center line C2 when the parking brake is not activated, where the center line C2 is the center line of the backing plate 16 orthogonal to both the center line C3 of the axis through-hole 100 and the center axis C1 of the strut 52. As a result, the shapes of the first parking lever 60 and the second parking lever 70 are further reduced in size, so that a sufficient gap can be ensured in the vehicle drum brake 10 for mounting the bearing of the axle, for example.

According to this example, the backing plate 16 has the axle through-hole 100 formed in the central portion for allowing insertion of the axle, while the lever return spring 64 is disposed such that both ends of the lever return spring 64 are latched the latching hole 60d formed in the first parking lever 60 and the notch 68 formed on the brake shoe 18 out of the pair of the brake shoes 18, 20 to urge the first parking lever 60 to the side away from the axle through-hole 100, i.e., the side coming into contact with the brake shoe 18, and the coupling pin 71 is formed on the side away from the axle through-hole 100, i.e., on the brake shoe 18 side, relative to the straight line D connecting the center of the mounting shaft 62 and the center of the latching hole 60d. As a result, the shapes of the first parking lever 60 and the second parking lever 70 are further reduced in size, so that a sufficient gap can be ensured in the vehicle drum brake 10 for mounting the bearing of the axle, for example.

According to this example, the first parking lever 60 and the second parking lever 70 are engaged with the first strut member 54 such that the first parking lever 60 and the second parking lever 70 are parallel to the center axis C1 of the strut 52 and are at positions symmetrical about the center axis C1. As a result, for example, when the parking brake is activated to apply braking with the parking levers, the first parking lever 60 and the second parking lever 70 can more easily apply a load to the first strut member 54 at the same time, where the first parking lever 60 and the second parking lever 70 are located on both sides of the shoe web 28 of the brake shoe 18. Therefore, the first parking lever 60 and the second parking lever 70 can more preferably restrain the unbalanced load from acting on the brake shoe 20.

Although the preferred example of the present invention has been described in detail with reference to the drawings, the present invention is not limited thereto and is implemented in other forms.

For example, in the example described above, the coupling pin 71 is integrated by press-fitting into the first coupling hole 60c and the second coupling hole 70c; however, the present invention is not necessarily limited thereto, and the coupling pin 71 may be integrated with the first coupling hole 60c and the second coupling hole 70c by riveting.

The above description is merely an embodiment, and the present invention can be implemented in variously modified and improved forms based on the knowledge of those skilled in the art without departing from the spirit thereof although not exemplarily illustrated one by one.

REFERENCE SIGNS LIST

10: Vehicle drum brake 16: Backing plate 18, 20: Brake shoe 52: Strut 54: First strut member 60: First parking lever 60d: Latching hole 62: Mounting shaft 64: Lever return spring 68: Notch 70: Second parking lever 70c: Coupling hole (Second coupling hole) 71: Coupling pin 100: Axle through-hole C1: Center axis C2: Center line C3: Center line

The invention claimed is:
1. A vehicle drum brake comprising:
 a pair of brake shoes arranged to be expanded on a backing plate;
 a first parking lever disposed to rotate around a predetermined mounting shaft positioned at one end portion of one of the brake shoes in a state where the first parking lever overlaps with the one of the paired brake shoes on the backing plate side with respect to the one of the paired brake shoes;
 a second parking lever made up of a member different from the first parking lever, disposed to rotate around the mounting shaft in a state where the second parking lever overlaps with the one of the paired brake shoes and the first parking lever on the side opposite to the backing plate side with respect to the one of the paired brake shoes, and coupled to and rotated together with the first parking lever; and
 a strut including a first strut member engaged with the first parking lever and the second parking lever, wherein
 the first parking lever and the second parking lever are integrated with each other by a coupling pin so as to be engaged with the first strut member at the same time.

2. The vehicle drum brake according to claim 1, wherein
the backing plate includes an axle through-hole formed in a central portion for allowing insertion of the axle, wherein
the second parking lever includes a coupling hole on an end portion away from the mounting shaft and is coupled to the first parking lever via the coupling pin fitted to the coupling hole, and wherein
the coupling pin is disposed such that a distance between the coupling pin and a center line of the backing plate is larger than a distance between the mounting shaft and the center line of the backing plate when a parking brake is not activated, where the center line of the backing plate is a center line orthogonal to a center line of the axis through-hole and a center axis of the strut.

3. The vehicle drum brake according to claim 2, wherein the first parking lever and the second parking lever are engaged with the first strut member such that the first parking lever and the second parking lever are parallel to the center axis of the strut and are at positions symmetrical about the center axis.

4. The vehicle drum brake according to claim 1, wherein
the backing plate includes an axle through-hole formed in a central portion for allowing insertion of the axle, wherein
a lever return spring is disposed such that both ends of the lever return spring are latched a latching hole formed in the first parking lever and a notch formed on the one of the paired brake shoes to urge the first parking lever to the side away from the axle through-hole, and wherein
the coupling pin is located on a side away from the axle through-hole relative to a straight line connecting the center of the mounting shaft and the center of the latching hole.

5. The vehicle drum brake according to claim 4, wherein the first parking lever and the second parking lever are engaged with the first strut member such that the first parking lever and the second parking lever are parallel to a center axis of the strut and are at positions symmetrical about the center axis.

6. The vehicle drum brake according to claim 1, wherein the first parking lever and the second parking lever are engaged with the first strut member such that the first parking lever and the second parking lever are parallel to a center axis of the strut and are at positions symmetrical about the center axis.

7. A vehicle drum brake comprising:
a pair of brake shoes arranged to be expanded on a backing plate;
a first parking lever disposed to rotate around a predetermined mounting shaft positioned at one end portion of one of the brake shoes in a state where the first parking lever overlaps with the one of the paired brake shoes on the backing plate side with respect to the one of the paired brake shoes;
a second parking lever made up of a member different from the first parking lever, disposed to rotate around the mounting shaft in a state where the second parking lever overlaps with the one of the paired brake shoes and the first parking lever on the side opposite to the backing plate side with respect to the one of the paired brake shoes, and coupled to and rotated together with the first parking lever; and
a strut including a first strut member engaged with the first parking lever and the second parking lever, wherein
the first parking lever and the second parking lever are coupled to each other by a coupling pin so as to be engaged with the first strut member at the same time,
the backing plate includes an axle through-hole formed in a central portion for allowing insertion of the axle,
the second parking lever includes a coupling hole on an end portion away from the mounting shaft and is coupled to the first parking lever via the coupling pin fitted to the coupling hole, and
the coupling pin is disposed such that a distance between the coupling pin and a center line of the backing plate is larger than a distance between the mounting shaft and the center line of the backing plate when a parking brake is not activated, where the center line of the backing plate is a center line orthogonal to a center line of the axis through-hole and a center axis of the strut.

8. The vehicle drum brake according to claim 7, wherein the first parking lever and the second parking lever are engaged with the first strut member such that the first parking lever and the second parking lever are parallel to a center axis of the strut and are at positions symmetrical about the center axis.

9. A vehicle drum brake comprising:
a pair of brake shoes arranged to be expanded on a backing plate;
a first parking lever disposed to rotate around a predetermined mounting shaft positioned at one end portion of one of the brake shoes in a state where the first parking lever overlaps with the one of the paired brake shoes on the backing plate side with respect to the one of the paired brake shoes;
a second parking lever made up of a member different from the first parking lever, disposed to rotate around the mounting shaft in a state where the second parking lever overlaps with the one of the paired brake shoes and the first parking lever on the side opposite to the backing plate side with respect to the one of the paired brake shoes, and coupled to and rotated together with the first parking lever; and
a strut including a first strut member engaged with the first parking lever and the second parking lever, wherein
the first parking lever and the second parking lever are coupled to each other by a coupling pin so as to be engaged with the first strut member at the same time,
the backing plate includes an axle through-hole formed in a central portion for allowing insertion of the axle,
a lever return spring is disposed such that both ends of the lever return spring are latched a latching hole formed in the first parking lever and a notch formed on the one of the paired brake shoes to urge the first parking lever to the side away from the axle through-hole, and
the coupling pin is located on a side away from the axle through-hole relative to a straight line connecting the center of the mounting shaft and the center of the latching hole.

10. The vehicle drum brake according to claim 9, wherein the first parking lever and the second parking lever are engaged with the first strut member such that the first parking lever and the second parking lever are parallel to a center axis of the strut and are at positions symmetrical about the center axis.

* * * * *